United States Patent [19]

Gainey

[11] Patent Number: 5,673,843
[45] Date of Patent: Oct. 7, 1997

[54] TRANSPORTABLE PIPE WELDING AND FABRICATION STATION

[76] Inventor: Kenneth Clifford Gainey, 31111 NW. Fifth Ct., Ridgefield, Wash. 98642

[21] Appl. No.: 477,994

[22] Filed: Jun. 7, 1995

[51] Int. Cl.$^6$ .................................................. B23K 37/053
[52] U.S. Cl. .......................... 228/44.5; 228/49.3; 269/41; 269/289 MR; 269/902; 29/272
[58] Field of Search ........................... 228/44.5, 49.3; 269/41, 43, 289 MR; 29/272

[56] References Cited

U.S. PATENT DOCUMENTS

| | | | |
|---|---|---|---|
| 2,500,204 | 3/1950 | Ronay | 113/111 |
| 2,550,159 | 4/1951 | Mickelson | 269/289 MR |
| 2,667,978 | 2/1954 | Pridy | 214/1 |
| 2,781,920 | 2/1957 | Burington | 214/1 |
| 2,945,523 | 7/1960 | Jenkins | 269/289 MR |
| 4,295,257 | 10/1981 | Strohs | 29/240 |
| 4,365,786 | 12/1982 | Osteen | 254/30 |
| 4,526,503 | 7/1985 | Muraguchi | 414/433 |
| 4,667,548 | 5/1987 | Astle et al. | 82/4 C |

FOREIGN PATENT DOCUMENTS 1435359  11/1988  U.S.S.R. .................. 228/44.5

*Primary Examiner*—P. Austin Bradley
*Assistant Examiner*—Jeffrey T. Knapp
*Attorney, Agent, or Firm*—Stoel Rives LLP

[57] ABSTRACT

A transportable welding station has a first tower supporting at least one pair of power-driven rollers and a second tower supporting a pair of rollers aligned with those of the first tower. A piece of pipe may be cut or welded as it is supported and rotated by the two sets of rollers, thereby permitting a smooth continuous cut or weld around the entire circumference of pipe. To accommodate different lengths of pipe, a welder can change the distance between the two towers. A version with two pairs of power-driven rollers supported by the first tower allows short lengths of pipe to be welded. Even shorter or irregularly shaped pieces may be welded as they are held by a chuck that is turned by the rollers supported by the first tower. A work table is also provided to allow those whose job is to tack, or tentatively join, pipe sections so that those people may work with a small ancillary welding machine. A fold-up jib crane allows heavy pipe workpieces to be loaded onto the welding station.

16 Claims, 4 Drawing Sheets

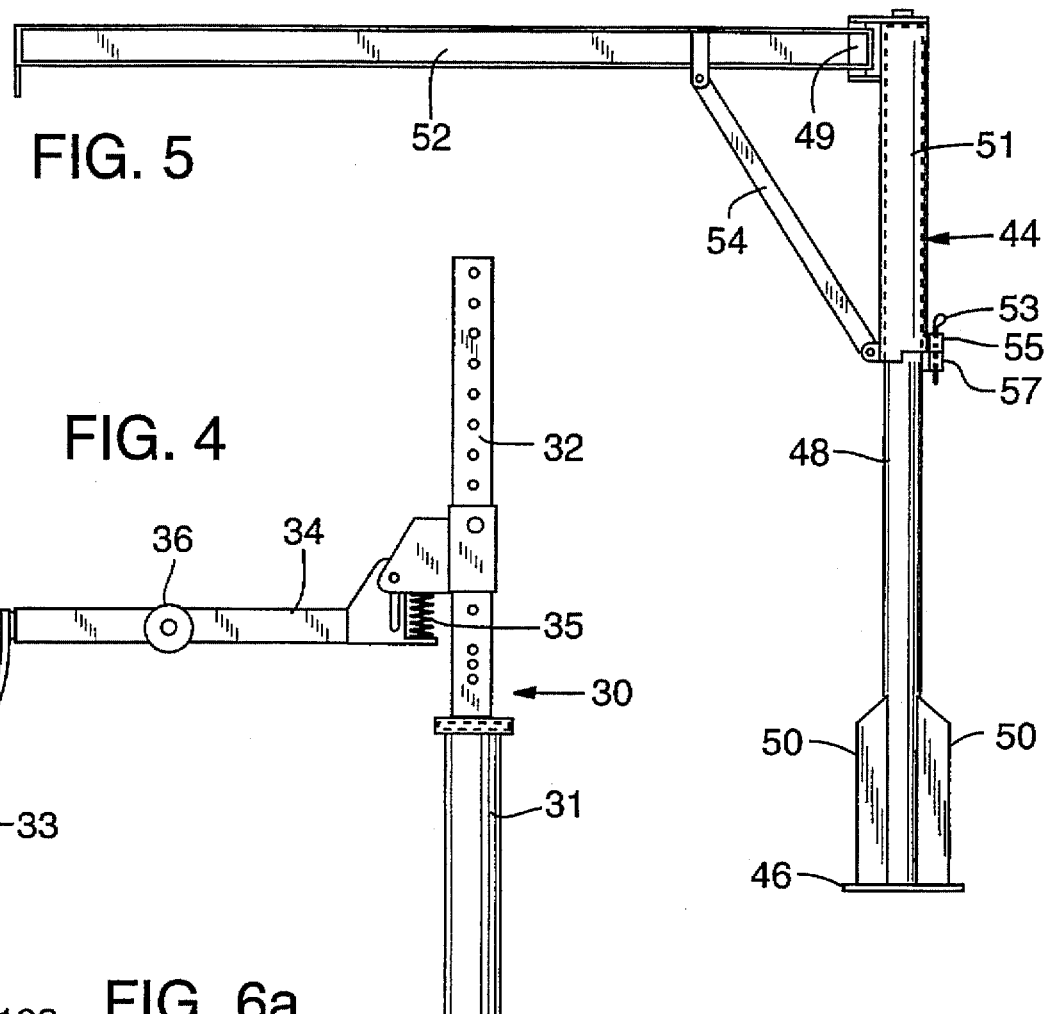
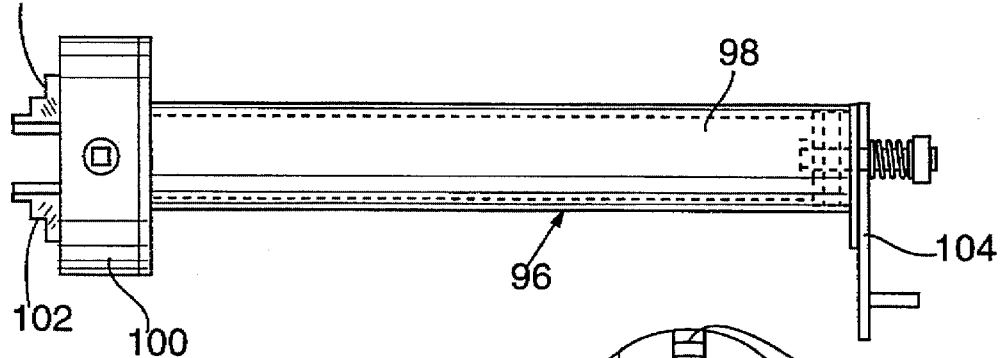
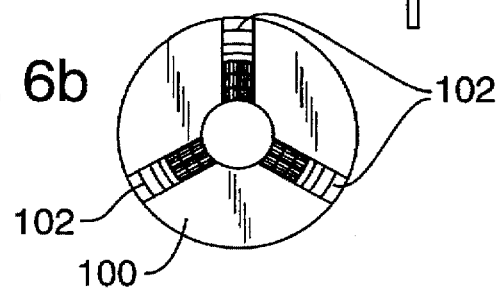

TRANSPORTABLE PIPE WELDING AND FABRICATION STATION

TECHNICAL FIELD

The invention is generally in the nature of equipment for welders. More specifically, the invention is a transportable work station to provide a group of pipe welders and fitters with superior work capabilities at a construction job site.

BACKGROUND OF THE INVENTION

In the construction of a large building with a piping system, it would be possible to weld together each elemental piece of pipe at the point where it is installed into the building. It is generally more economical, however, to weld together a number of pipe components prior to installation, so that an entire section of piping may be installed at once. This is a better method because it is usually most difficult to weld pipe together in the confines of the spot where the pipe is to be installed.

The job supervisor typically has the choice of having the pre-installation welding performed at a shop, typically remote from the building site, or having the pipe welded together on site. Unfortunately, having the pipe welded together at a remote shop exacerbates the already challenging process of construction planning. If there is a miscommunication between the job site and shop personnel, resulting in the failure to deliver a critical section of pipe when expected, several valuable workers may be idle while waiting for the correct section of pipe to arrive.

The method of fabricating sections of pipe at the job site, however, has its own set of problems. The team of pipe welders assigned to this sort of job typically is equipped only with rudimentary tools for retaining the pipe segments while joining them. Because there is no way of smoothly and consistently rotating the pipe, the welder must weld together one portion of the pipe circumference, stop welding, turn the pipe himself, and weld together another section of the pipe circumference.

Not only is this procedure time consuming but the quality of the finished weld suffers because of the weld discontinuities between one working circumference section and the next. In addition, the need for increased handling of the pipe or other workpiece while a portion of it is extremely hot increases the probability of injury to the welder.

Some categories of pipe components that are particularly challenging for welders to handle efficiently away from a well-equipped shop are short pieces of pipe or pieces in which there is a sudden bend or "elbow." A long, straight piece of pipe may be balanced on two supports so that the area to be worked extends outwardly beyond one of the supports. A short and/or bent piece of pipe being worked on must be retained in place by means of a retaining element, which must then be loosened to allow rotation of the component when the welder desires to work on a different circumferential portion of the pipe.

Transporting heavy pieces of pipe around the work area also presents a problem to craftsmen. Although small transportable "jib cranes" are available, it is typical for welders to find any support strong enough to bear the weight of a heavy pipe section and then loop a choker around the support and loop the loose end of the choker around the pipe section to form a crude suspension system with which the pipe section may be swung into place.

A fair amount of effort has been expended to make the task of the welder easier and safer. Unfortunately, most of the resultant systems are difficult to employ outside of the workshop environment. For instance, some prior art systems are fixed in place and are not transportable. One prior art system rests on rails. Another must be supported on a "bed frame." Yet another prior art system comes in two pieces that could work cooperatively only if they were both placed on the same flat surface. Such a system has little utility in a field installation.

SUMMARY OF THE INVENTION

One object of the present invention is to provide a transportable welding station for rotating a pipe workpiece while it is being cut to finished length or welded.

Another object of the present invention is to provide a transportable welding station that a welder may use to accommodate various lengths of pipe by altering the distance between rotatable pipe supports.

A further object of the present invention is to provide a transportable welding station that may accommodate short and irregular pieces of pipe through the use of two sets of powered rollers spaced a short distance apart.

Still another object of the present invention is to provide a chuck that may be used with virtually no installation effort in a transportable work station.

A preferred embodiment of the present invention comprises a transportable welding station with a first tower supporting at least one pair of power-driven rollers and a second tower supporting a pair of rollers parallel to and axially aligned with the pair of rollers on the first tower, and in which the distance between the first and second towers may be changed. This configuration allows a welder, working at a construction job site, to rotate a workpiece while he cuts or welds to achieve a smooth circumferential joint. The first and second towers, set at a controllable distance apart, allow pipes of many different lengths to be accommodated by the system.

In an alternative embodiment, the invention may comprise at least one tower with two pairs of power-driven rollers for work on shorter pieces of pipe.

In yet another embodiment the invention includes a cylinder with a chuck rigidly attached to one end and facing axially outward. Such a device may be placed on the powered rollers for rotating small pieces of pipe or components.

Additional objects and advantages of this invention will be apparent from the following detailed description of preferred embodiments thereof which proceeds with reference to the accompanying drawings.

BRIEF DESCRIPTION OF THE DRAWINGS

FIG. 4 is a side view of the tie-down of the welding station of FIG. 1;

FIG. 5 is a side view of the jib crane of the welding station of FIG. 1;

FIG. 6a is a side view of the chuck device shown of the welding station of FIG. 1; and FIG. 6b is a front view of the chuck device of FIG. 6a.

DETAILED DESCRIPTION OF PREFERRED EMBODIMENTS

Figure 1:
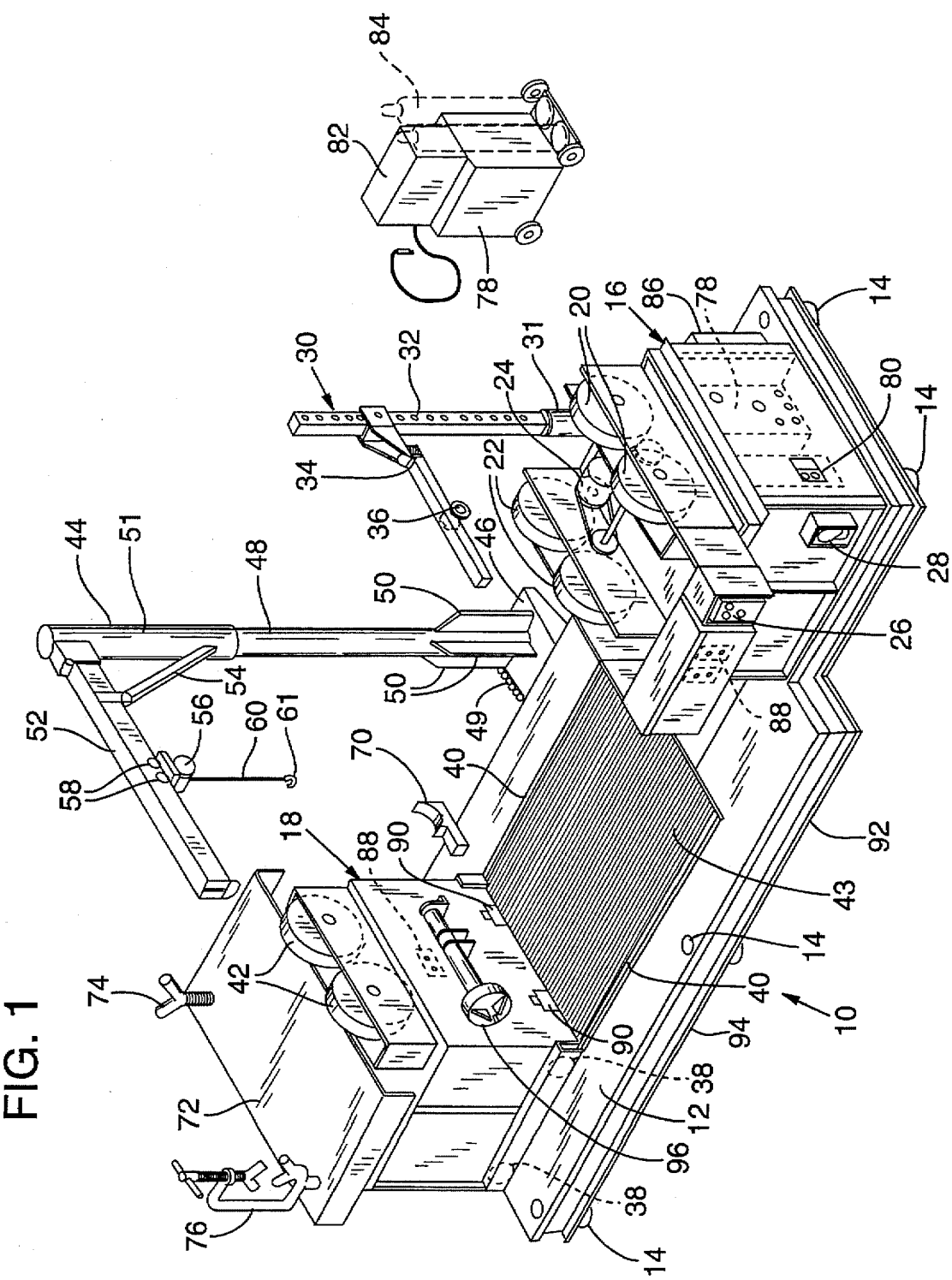
FIG. 1 is an isometric view of a transportable work station according to the present invention.
Figure 2:
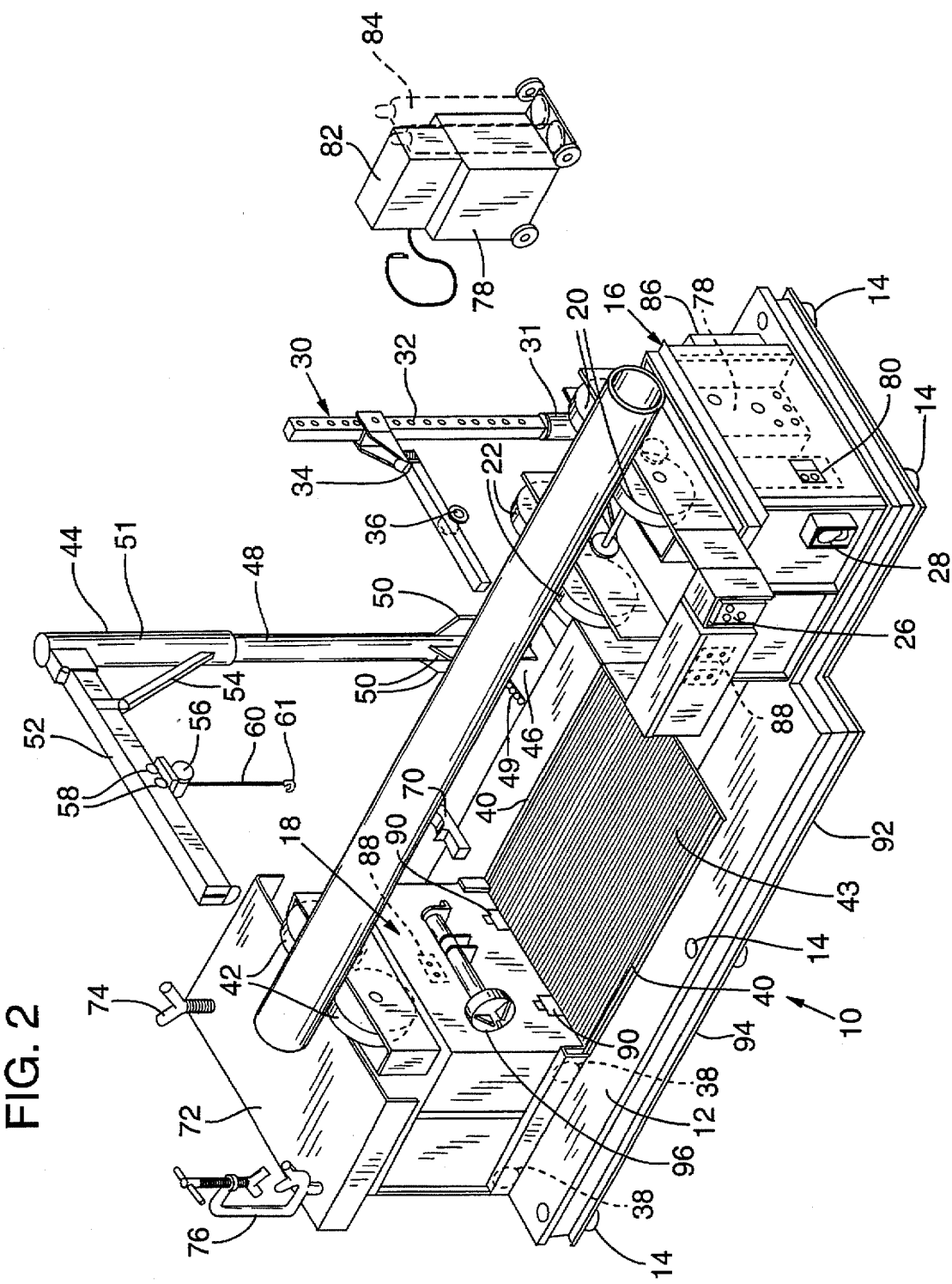
FIG. 2 is an isometric view of the transportable work station of FIG. 1 supporting a pipe workpiece on its rollers.
Figure 3:
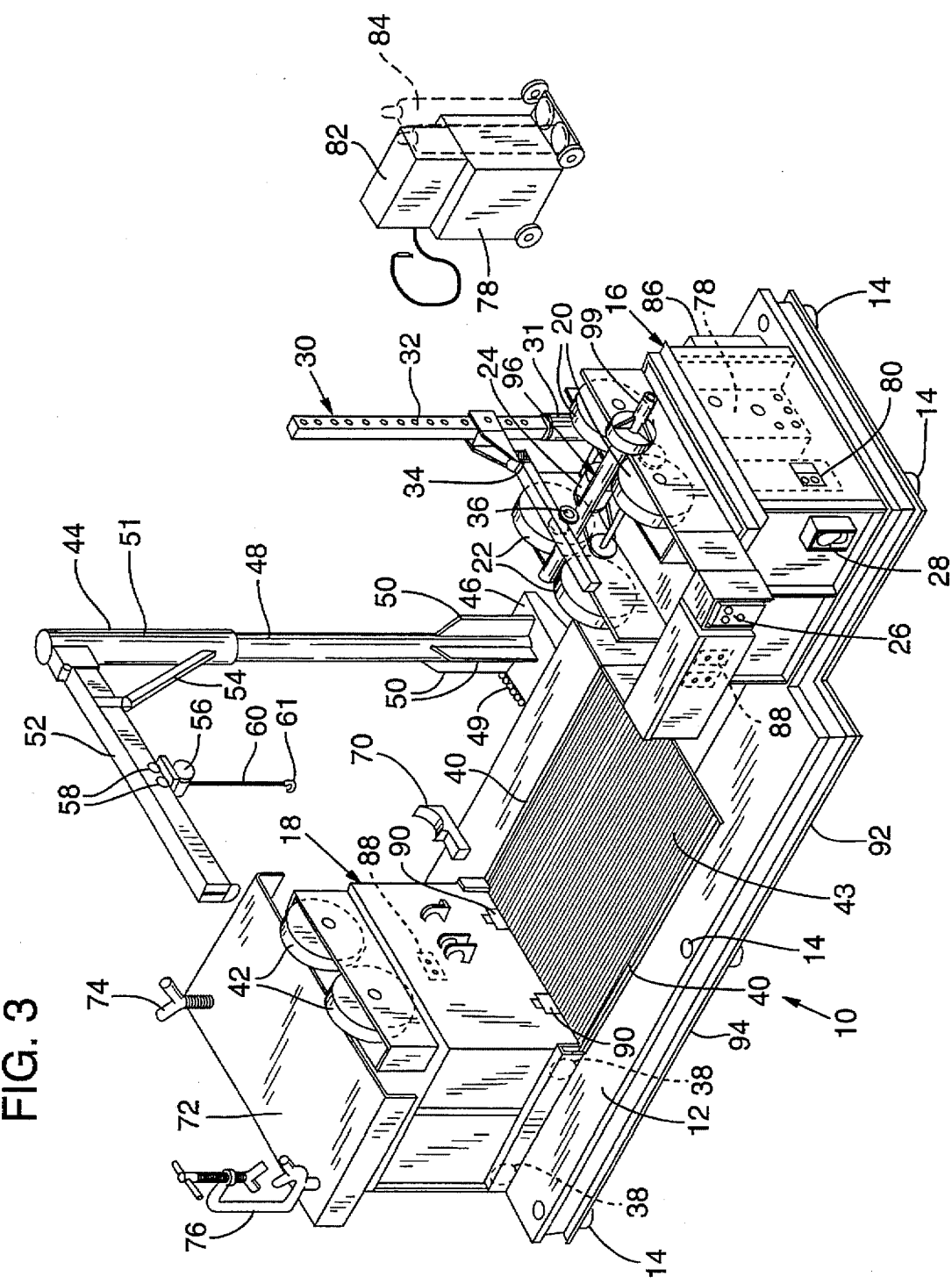
FIG. 3 is an isometric view of the transportable work station of FIG. 1 showing a chuck device supported by two pairs of rollers and gripping a workpiece.

FIGS. 1, 2, and 3 show a preferred embodiment of a transportable welder's work station 10. A steel platform 12 may be placed level on most surfaces through the use of six legs 14 of adjustable lengths (only four shown). Platform 12 also supports a first tower 16 and second tower 18. First tower 16 is fixed in place on steel platform 12 and supports a first pair of power-driven rollers 20 and a second pair of power-driven rollers 22. All four rollers have the same diameter. Second set of rollers 22 is positioned radially parallel to, axially aligned with, and driven coincidentally with first set of rollers 20.

The two roller sets 20 and 22 are driven by an electric motor 24, the speed of which may be controlled through hand controls 26 or foot controls 28 (shown in stowed position). A folding adjustable tie-down assembly 30 (FIG. 4) is positioned adjacent the side of first tower 16 and comprises a vertical support 32 rotatably mounted on base 31 and a folding member 34 (shown in horizontal position). Approximately midway across the folding member there is a pair of wheels 36 for engagement with the workpiece. The height of folding member 34 is adjustable so that it may be raised or lowered so that pair of wheels 36 firmly contacts the workpiece to keep it in firm rolling contact with the two roller sets 20 and 22. Folding member 34 maintains firm contact with workpiece by means of an adjustable strap 33 (shown in FIG. 4 only) on a first end and a spring mechanism 35 on a second end which allows for irregularities in workpiece diameter. Spring mechanism 35 also pushes folding member 34 up away from workpiece when strap 33 is loosened. This allows tie down assembly 30 to be rotated on base 31 away from the workpiece, allowing access to the workpiece.

First tower 16 is sufficient by itself for working on straight workpieces that are relatively short, i.e., about two and one-half to five feet long. Typically, the welder places the workpiece so that it is supported by the two sets of rollers 20 and 22, with the portion to be worked on extending outwardly from the front of first pair of rollers 20. Using foot control 28, the welder may then control the rotation of the pipe so that he may either cut the workpiece or weld together two tentatively joined pieces in one continuous operation.

The two pairs of power-driven rollers 20 and 22 shown and described are extremely useful for handling short pieces of pipe. Work station 10, however, would be generally operable with only one pair of power-driven rollers supported by first tower 16. Likewise, if first tower 16 were included in work station 10 but second tower 18 and rigid platform 12 were eliminated, work station 10 would still have good utility for work on short pieces of pipe.

Second tower 18 is slidably supported on steel platform 12 by a set of four wheels 38 (two shown) conforming to a pair of tracks 40 positioned on the upper surface of steel platform 12. A pair of free spinning rollers 42 is supported by second tower 18. Rollers 42 are positioned radially parallel to and axially aligned with rollers 20 and 22 supported by first tower 16 and are set to rotate freely. As shown in FIG. 2, a long piece of pipe 43 may be positioned so that it is supported by all three sets of rollers and (tensioned properly by tie-down assembly 30) turned by rollers 20 and 22 of first tower 16 and supported by rollers 42 of second tower 18. If the welder performs the work between the two towers 16 and 18, the welding debris will fall harmlessly through a grate 43.

A stowable jib crane 44 (FIG. 5) is attached to steel platform 12 for moving heavy portions of pipe. In its upright form, as shown in FIGS. 1 and crane 44 rests on a hinged side platform 46. A bottom column 48 of jib crane 44 is supported by four side flanges 50 (three shown). A top column 51 fits about bottom column 48 and is held in place by pin 53 through eyelets 55, 57. Connected by a hinge 49 to the top of top column 51 is an I-beam member 52 supported in its extended position by a diagonal brace 54. An electric hoist 56 (not shown in FIG. 5) may be suspended from rollers 58, which are set to roll on the bottom and along the length of I-beam 52. To use hoist 56 to position a heavy piece of pipe, a craftsman attaches the pipe onto a chain 60, which is suspended from hoist 56 and to which a hook 61 is attached, balances the pipe about hook 61, uses hoist 56 to raise the pipe and slide it into place (possibly with the help of an assistant), and then uses hoist 56 to lower the pipe onto rollers 20, 22, and 42.

FIG. 5 shows the method by which top column 51 may be rotated about bottom column 48 to make jib crane 44 stowable. Electric hoist 56 may then be easily removed and stowed, and I-beam member 52 folded down. Pin 53 is removed so top column 51 may be rotated about bottom column 48. Jib crane 44 may then be turned downward on hinge 49 and stowed in a saddle 70, with I-beam member 52 facing upwards, to accommodate the transportation of the work station 10.

Attached to the rear top surface of second tower 18 is a work table 72 that is equipped with a pipe leveling device 74 and a pipe vice 76. Table 72 is particularly useful because it allows the welder's assistants (called "joiners") an area to tack (or join in a tentative fashion) the pieces of pipe to be joined permanently. Because the welder can work quite rapidly with the pipe rotating equipment, it is important that the craftsmen be able to keep pace.

There is considerable stowage space in first tower 16 and second tower 18. In first tower 16, a high quality modern welding machine 78 would typically be stored. Such a machine can solve three welding problems in a manner that is very convenient for the welder. The first problem is that the temperatures at which steel is welded dictates that the steel be protected from oxidation caused by contact with oxygen. Modern welding machines solve this problem by blowing a stream of inert gas onto the area being welded.

The second problem is the tip of the welding gun itself becomes so hot that it could become damaged. This problem is solved by a water cooler 80 that circulates water through a channel near the tip to continuously cool the tip and keep its temperature below the damage level.

The third problem is an adequate means to constantly add more welding material to the weld. Welding machine 78 has a continuous wire feed device 82 in which a roll of welding material gets fed into the welder directly to where the flame is.

In first tower 16 of work station 10, there is room to store welding machine 78 and water cooler 80 for the welding torch. In second tower 18, there is room for storing the wire feed device 82. An inert gas container 84 for welding machine 78 is typically delivered by a "welding supply shop" directly to the work site. In second tower 18, a smaller ancillary welding machine (not shown) used for "tacking" or joining the pipe pieces together in a tentative manner to facilitate the welding at the full weld station may be stored.

The preferred embodiment of station 10 generates no electricity itself but includes a set of plugs 86 for accepting either 440 VAC 3-phase or 230 VAC power and also 110 VAC power, all of which are generally readily available at a construction site. Another set of plugs 88 makes this electrical power available at different points in station 10 for the various types of electrical devices that may be used.

To prepare the work station for transportation, a workman stows jib crane 44 and secures tie-down assembly 30. He also moves second tower 18 toward first tower 16 to the forward end of tracks 40 and retains it in place by clips 90. This brings the lengthwise moment of work station 10 to a minimum so that it may be lifted by a fork lift extending its prongs form the side at about points 92 and 94. The fork lift may then lift work station 10 from its side onto a flat bed truck or onto a trailer designed specially to hold work station 10.

FIG. 3 shows work station 10 with an easy-to-use chuck device 96 (shown stowed in FIG. 1) being utilized to rotate a small workpiece. Chuck device 96 includes a cylinder 98 that may be placed on power-driven rollers 20 and 22 so that it rotates as they rotate. A small or irregularly shaped piece of pipe 99 (FIG. 3) may be attached to a chuck 100 (FIGS. 6a and 6b) of chuck device 96 by moving gripper elements 102 inwardly until they are in gripping contact with the pipe workpiece. The workpiece may then be rotated with chuck device 96. Larger pieces of pipe may be retained by shifting gripper elements 102 outward until firm contact is made with pipe. The chuck is grounded, even during rotation, by contract rotatable attachment 104. In welding it is always necessary for the device being welded or cut to be grounded.

It will be obvious to those having skill in the art that many changes may be made to the details of the above-described embodiments of this invention without departing from the underlying principles thereof. The scope of the present invention should, therefore, be determined only by the following claims.

I claim:

1. A transportable pipe fabricating work station configured for a pipe workpiece to be supported lengthwise along the lengthwise dimension of the work station, comprising:
   a free-standing base in the form of a rigid platform;
   a first tower supported by and attached to the rigid platform;
   a second tower supported by and connected with the rigid platform and displaced lengthwise from the first tower;
   at least one pair of power-driven rollers sharing the same radial plane and supported by the first tower at the same distance above the rigid platform;
   a pair of rollers supported by the second tower, the rollers oriented radially parallel to the power-driven rollers; and
   means for adjusting the lengthwise distance between the first and second towers while maintaining the parallel orientation of between the pairs of rollers.

2. The work station of claim 1 in which the pair of rollers supported by the second tower is set to rotate freely.

3. The work station of claim 1 further comprising a set of at least four legs of adjustable lengths that are attached to the bottom of the rigid platform for leveling the rigid platform on an uneven surface.

4. The work station of claim 1 wherein the power-driven rollers are driven by an electric motor having user operable variable speed controls.

5. The work station of claim 1 wherein the second tower is adaptable to be latched in place relatively close to the first tower, thereby lessening the lengthwise moment of the work station and easing the task of using a forklift to sideways load the work station onto a truck or trailer.

6. The work station of claim 1 wherein the first and second towers further include stowage compartments.

7. The work station of claim 1 wherein the first tower further includes a second pair of power-driven rollers lengthwise displaced from, parallel to, axially aligned with, and driven coincidentally with the first pair of power-driven rollers.

8. The work station of claim 1 further comprising a folding jib crane hinged to the rigid platform.

9. The work station of claim 8 wherein the jib crane is equipped with a hoist.

10. The work station of claim 1 wherein the second tower further includes a raised flat work area to ease the task of joining a first pipe workpiece with a second pipe workpiece in a temporary manner prior to welding them together.

11. The work station of claim 10 wherein the flat work area is equipped with clamps for holding a first pipe workpiece and a second pipe workpiece while they are being joined.

12. A transportable fabrication work station configured to support a pipe workpiece lengthwise along the lengthwise dimension of the work station, comprising:
   a rigid platform;
   a first tower supported by and connected to the rigid platform;
   a first pair of power-driven rollers, supported by the first tower, sharing the same radial plane, and positioned at the same distance above the rigid platform; and
   a second pair of power-driven rollers supported by the first tower and having diameters equal to those of the first pair of rollers, the second pair of rollers being positioned radially parallel to, positioned in axial alignment with, and driven coincidentally with the first pair of rollers.

13. The work station of claim 12 further comprising a pipe restraining member located medially between the sets of rollers and including:
   a first vertical bar attached to the work station;
   a second bar attached to the vertical bar such that the second bar may be rotated and extended horizontally inwardly over the work station, the first and second bars being configured so that the second bar may be moved vertically relative to the rollers;
   at least one wheel rotatably attached to the second bar in its horizontally extended position; and
   means for downwardly restraining the second bar in its horizontally extended position so that the wheel or wheels attached to the second bar exert downward pressure against the top of the pipe workpiece, thereby causing the surface of the pipe workpiece to be more firmly engaged with the rollers.

14. The work station of claim 12 further comprising at least four legs of adjustable lengths that are attached to the bottom of the platform for leveling the platform.

15. The work station of claim 12 further equipped with a system having a cylinder and a chuck attachable to one end of the cylinder such that the chuck faces outwardly along the axis of the cylinder, the cylinder being adapted for placement on the power-driven rollers of the work station so that a small pipe workpiece attached to the chuck may be controllably rotated during welding.

16. The work station of claim 15 wherein the system further includes a chuck specially designed for accommodating an elbowed piece of pipe, the chuck having a face and being attachable to one end of the cylinder so that the face of the chuck is positioned outwardly from the axis of the cylinder.

* * * * *